US012779808B2

(12) United States Patent
Chandran et al.

(10) Patent No.: US 12,779,808 B2
(45) Date of Patent: Nov. 3, 2026

(54) SUCTION BAR SYSTEM FOR A CONVERTING MACHINE

(71) Applicant: BOBST MEX SA, Mex (CH)

(72) Inventors: Olivier Chandran, Lausanne (CH); Tim Lair, Bussigny (CH)

(73) Assignee: BOBST MEX SA, Mex (CH)

( * ) Notice: Subject to any disclaimer, the term of this patent is extended or adjusted under 35 U.S.C. 154(b) by 123 days.

(21) Appl. No.: 18/874,688

(22) PCT Filed: Jun. 28, 2023

(86) PCT No.: PCT/EP2023/067728
§ 371 (c)(1),
(2) Date: Dec. 13, 2024

(87) PCT Pub. No.: WO2024/003185
PCT Pub. Date: Jan. 4, 2024

(65) Prior Publication Data

US 2026/0249580 A1 Aug. 27, 2026

(30) Foreign Application Priority Data

Jun. 29, 2022 (EP) .................................... 22181814

(51) Int. Cl.
*B31B 50/07* (2017.01)
*B26D 7/01* (2006.01)
(Continued)

(52) U.S. Cl.
CPC .............. *B31B 50/07* (2017.08); *B26D 7/015* (2013.01); *B26D 7/018* (2013.01); *B31B 50/022* (2017.08); *B31B 50/042* (2017.08); *B31B 50/142* (2017.08)

(58) Field of Classification Search
CPC ........ B65H 9/08; B65H 5/085; B65H 29/686; B65H 23/245; B26D 7/015
See application file for complete search history.

(56) References Cited

U.S. PATENT DOCUMENTS 3,779,545 A * 12/1973 Schuhmann ............. B65H 9/08 271/204
3,972,523 A * 8/1976 Brandes ............... B65H 29/686 271/183
(Continued)

FOREIGN PATENT DOCUMENTS

CN 211769233 U 10/2020
JP 2003118072 A 4/2003
(Continued)

*Primary Examiner* — Gloria R Weeks
(74) *Attorney, Agent, or Firm* — Bookoff McAndrews PLLC

(57) ABSTRACT

The present invention relates to suction bar system for a converting machine (10), the suction bar system comprising at least one suction bar assembly (31) comprising a suction plate mounted on a transverse beam having an internal air supply channel (34). The suction plate (36) comprises a plurality of main airflow channels (48) wherein each of the main airflow channels (48) is provided with a first suction opening (46*a*) and a second suction opening 46*b*. The main airflow channel (48) is provided with a constricted section (S2) with a first connecting duct (50) configured to generate a pressure drop in the first suction opening (46*a*).

20 Claims, 3 Drawing Sheets

(51) Int. Cl.

| | |
|---|---|
| ***B31B 50/02*** | (2017.01) |
| ***B31B 50/04*** | (2017.01) |
| ***B31B 50/14*** | (2017.01) |

(56) References Cited

U.S. PATENT DOCUMENTS

| | | | | | |
|---|---|---|---|---|---|
| 5,951,006 | A * | 9/1999 | Biegelsen | B65H 23/24 406/88 |
| 9,193,554 | B2 * | 11/2015 | Ansermot | B65H 29/686 |
| 10,569,984 | B2 * | 2/2020 | Chatry | B65H 31/32 |
| 11,827,478 | B2 * | 11/2023 | Delley | B65H 5/085 |
| 2012/0224003 | A1 * | 9/2012 | Lindenaar | B41J 11/0085 271/104 |
| 2015/0013514 | A1 * | 1/2015 | Strauss | F41H 5/0442 269/21 |
| 2015/0102554 | A1 | 4/2015 | Ansermot | |
| 2015/0111715 | A1 * | 4/2015 | Kloft | B65H 45/12 493/450 |
| 2022/0032658 | A1 * | 2/2022 | Kodera | B65H 5/085 |

FOREIGN PATENT DOCUMENTS

| | | | |
|---|---|---|---|
| JP | 2014172751 | A | 9/2014 |
| WO | 2020245116 | A1 | 12/2020 |
| WO | 2022122805 | A1 | 6/2022 |

* cited by examiner

SUCTION BAR SYSTEM FOR A CONVERTING MACHINE

CROSS-REFERENCE TO RELATED APPLICATION(S)

This application is a National Stage Application under 35 U.S.C. § 371 of International Application No. PCT/EP2023/067728, filed on Jun. 28, 2023, which claims priority to European Application No. 22181814.9, filed on Jun. 29, 2022, the entireties of which are incorporated herein by reference.

FIELD OF THE INVENTION

The present invention relates to a converting machine for producing box- and packaging blanks. In particular, it relates to a suction bar system configured for holding the blanks in the converting machine.

BACKGROUND

Converting machines are used in the production of packaging items such as paperboard and cardboard boxes. The platen press is a converting machine which can be configured to process blanks such as paperboard and corrugated cardboard sheets. Specifically, the platen press machine is configured to punch out blanks for boxes and packaging elements from the sheets. The platen press is sometimes also referred to as a “die-cutting machine”.

The platen press machine comprises a plurality of processing units or stations. A conveyor system is provided within such a machine in order to hold and transfer the blank from one processing unit to the next.

The conveyor system helps positioning the sheet such that the processing operations are performed on the correct position on the blank. The conveyor system may comprise a gripper bar configured to seize the front leading edge of the blank. The gripper bar keeps the blank at a correct longitudinal and lateral position and conveys the blank according to a predefined register timing.

However, it is also desirable to hold the rear edge in position with a suction bar and prevent bending or deformation of the sheet. As the speed of the gripper bar varies, the blank tends to bend during the deceleration.

Document WO20245116 A1 discloses a suction bar for holding a rear edge of a sheet as the sheet is transported through a platen press machine. The suction bar comprises a line with a plurality of air openings located side by side. However, the suction bar needs to be positioned at a specific vertical distance from the blank in order to hold the blank in position. A problem arises when the blank dimension and thickness change and the distance from the blank to the suction bar increases.

SUMMARY

In view of the above-mentioned problem, it is an object of the present invention to provide a suction bar assembly with improved capabilities of grasping and holding the rear edge of the sheet such that the suction force is adapted to hold sheets with different dimensions.

This object is solved by a suction bar system according to claim 1 and a positioning system according to claim 14.

According to a first aspect of the present invention, there is provided a suction bar system for a converting machine, the suction bar system comprising at least one suction bar assembly comprising a suction plate mounted on a transverse beam having an internal air supply channel, the suction plate having a suction surface configured to apply suction against a blank conveyed in a direction of transportation through the converting machine, wherein the suction plate comprises a plurality of main airflow channels, each main airflow channel comprising an air inlet connected to the air supply channel and an air outlet, and wherein a flow direction extends between the air inlet and the air outlet, and wherein each of the main airflow channels is provided with a first suction opening and a second suction opening, said suction openings being provided on the suction surface, and wherein the main airflow channel is provided with a constricted section with a first connecting duct connected to the first suction opening and wherein the constricted section is configured to generate a pressure drop in the first suction opening.

The present invention is based on a realization that the grasping of a blank by the suction bar can be improved and performed more quickly by first reducing the air volume present between the suction bar and the blank while applying a strong local suction force at the rear edge of the blank.

In an embodiment, the main airflow channels have a cross-sectional area in the flow direction upstream of the second suction openings which is larger than the cross-sectional area of the constricted section. The suction bar system is designed to create a combined airflow from the inlet airflow and the airflow from the first suction openings, such that a large air volume is injected through the main airflow channel at the second airflow openings. This combined airflow thus passes through the connection section to the second air openings and generates a high suction volume through the second air openings.

In an embodiment, the first and second suction openings are arranged in separate lines perpendicular to the direction of transportation T. Hence, the lines are arranged in a longitudinal direction of the transverse beam.

In an embodiment, the constricted section of the main airflow channel is a venturi section.

The second suction opening is preferably connected to the main airflow channel via a second connecting duct. The connection duct to the first suction opening is preferably located upstream of the connection duct to the second suction opening in the flow direction.

In an embodiment, the first suction openings are located further downstream in the direction of transportation than the second suction openings.

The internal air supply channel may have an inlet end connected to an airflow generator and may be provided with a plurality of distribution outlet openings configured to be aligned with air inlet openings on the suction plate.

Preferably, the suction plate is a separate part and is removably mounted to the transverse beam.

In an embodiment, the first suction openings are arranged at a distance from the second suction openings, and wherein the distance is less than 10 times the diameter of the main airflow channel at the second suction opening.

The distance between a first suction opening and a second suction opening can be different among the main channels.

For instance, the suction openings can be arranged in a staggered pattern such that the suction surface comprises a regular array of suction openings. This means that the length of a distance section can be different for some of the main channels.

In an embodiment, the suction bar system may further comprise a deflection flange, and wherein the outlet opening of the main airflow channel is located under the deflection flange.

In an embodiment, the suction bar system may further comprise a displacement mechanism comprising a first and second slide rails and wherein the suction bar is slidably mounted to the slide rail.

According to a second aspect of the present invention there is provided a positioning system comprising a suction bar system and a gripper unit, the gripper unit being configured to grasp and position the front leading edge of a blank, and wherein the suction bar system is positioned with the first suction opening located further upstream in the direction of transportation than the second suction openings.

In an embodiment, the positioning system comprises a plurality of suction bar assemblies arranged along the direction of transportation. Hence a suction bar assembly is located in each workstation and configured to hold the rear edge of the blank.

BRIEF DESCRIPTION OF THE DRAWINGS

The invention will now be described with reference to the accompanying drawings, in which like features are denoted with the same reference numbers and in which.

DETAILED DESCRIPTION

The present invention will be described in relation to a platen press converting machine. However, the present invention can be integrated into other types of printing and folding modules for converting machines, where it can be used to stabilize sheets and blanks during transportation.

Figure 1:
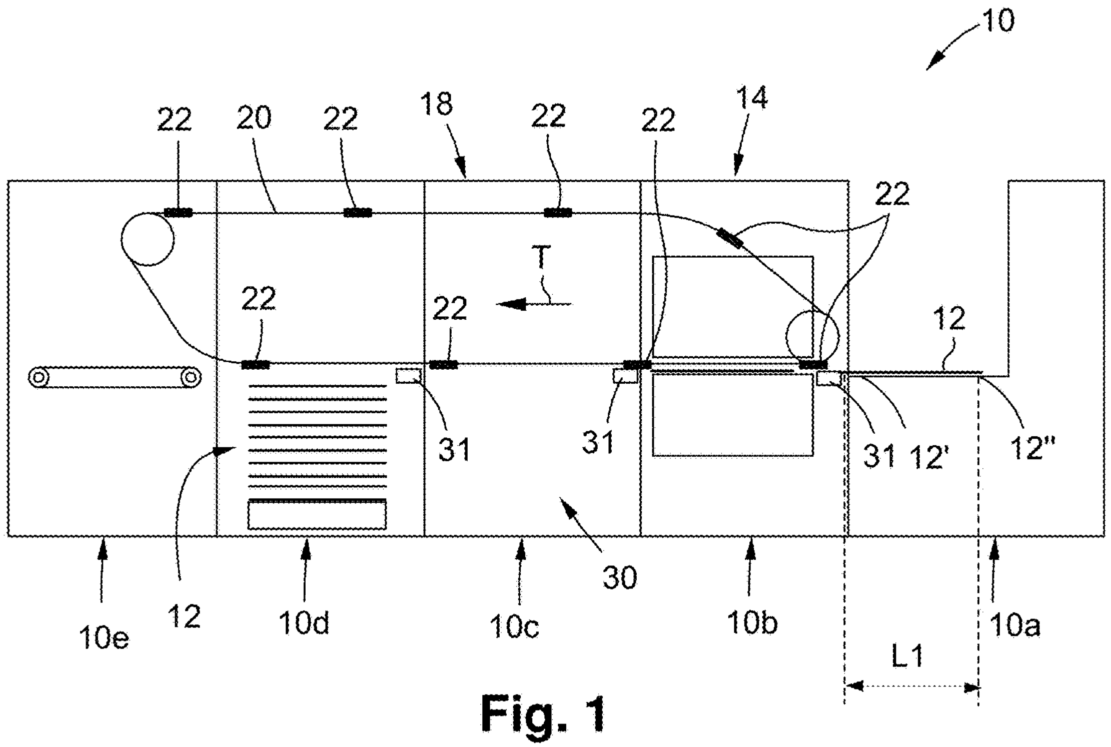
FIG. 1 is a schematic cross-sectional view of a converting machine in the configuration of a platen press.

Referring to FIG. 1, a converting machine 10 in the form of a platen press machine 10 is illustrated. The platen press machine 10 is configured for transforming sheets 12 into blanks 12. The sheet 12 is thus transformed into a final blank 12 as it is conveyed through the converting machine 10. Within the context of this application, term "blank" is used for the initial sheet 12 loaded into the converting machine 10, an intermediate blank 12 in the converting machine 10 and a final blank 12 as produced by the converting machine 10.

The converting machine 10 is composed of a plurality of workstations or units, each performing a specific operation on the blanks 12. In a direction of transportation T of the blanks 12, the converting machine 10 comprises a feeder unit 10*a*, a platen press unit 10*b*, a stripping unit 10*c*, a blanking unit 10*d* and a waste evacuation unit 10*e*.

The blanks 12 may subsequently be collected from the platen press 10 and introduced into a folder-gluer converting machine where they are automatically glued and folded to form folding boxes. Alternatively, the blanks 12 from the platen press machine 10 may be used as flat-packed boxes and can be folded manually.

The feeder unit 10*a* is configured to receive a stack of blanks 12 and feed them one by one into the platen press unit 10*b*. The blanks 12 may be pre-printed with text or ornamental features. Alternatively, blanks 12 may be deprived from printing features. The platen press unit 10*b* comprises a die-cutting tool provided with cutting and creasing rules which are configured for cutting and creasing the sheet 12.

The stripping unit 10*c* is configured for eliminating certain waste elements from the cut sheet 12. The blanking unit 10*d* is arranged after the stripping unit in the direction of transportation T and is configured to separate the blank 12 from the cut-away waste and arrange the blanks 12 in a stack.

After the blanking unit 10*d*, the waste evacuation unit 10*e* is configured for the elimination of further waste elements of the cut sheet 12. The waste evacuation unit 10*e* may comprise a conveyor that moves the waste away from the platen press machine.

The blank 12 is transported through the converting machine 10 by a conveyor system 18 comprising a conveyor belt 20 to which a plurality of gripper units 22 are attached. The gripper units 22 may also be referred to as "gripper bars" 22. The gripper units 22 are configured for gripping the front edges 12' of the blanks 12 and conveying the blanks 12 in a guided manner through the converting machine 10. The gripper units 22 release the formed blank 12 at the blanking unit 10*d*. The gripper units 22 are spaced apart from each other at a fixed distance, such that the distance between the leading edges 12' of the blanks 12 is also fixed. The conveyor belt 20 is arranged above the blanks 12 and performs a trajectory above the transportation path of the blank 12. The gripper units 22 transport the blank 12 between the different workstations and momentarily stops the blank 12 when the platen press 10*b* strikes the blank 12.

The rear edges 12" of the blanks 12 are held by a suction bar system 30 comprising at least one suction bar assembly 31. The suction bar system 30 may comprise a plurality of suction bar assembles 31. Preferably, the suction bar system 30 is located on the opposite side of the conveyor belt 20 with the gripper units 22. In such a way, interference and space constraints between the two systems 18, 30 can be reduced. In the illustrated embodiment, the suction bar system 30 is located below the blank 12.

The converting machine 10 may thus comprise a suction bar assembly 31 in each of the platen press unit 10*b*, the stripping unit 10*c* and the blanking unit 10*d*. Each suction bar assembly 31 is positioned such that it holds the rear edge 12" of the blank 12 in each respective workstation. Each blank 12 in movement through the converting machine 10 thus has its rear edge 12" held by a suction bar assembly 31 when a processing operation is performed on the blank 12.

The gripper unit 22 moves through the different workstations and performs a return path to return from the blanking unit 10*d* to the platen press unit 10*b*. The suction bar assembly 31 is stationary and is located at an upstream position in each workstation 10*b*, 10*c*, 10*d*.

Figure 4A:
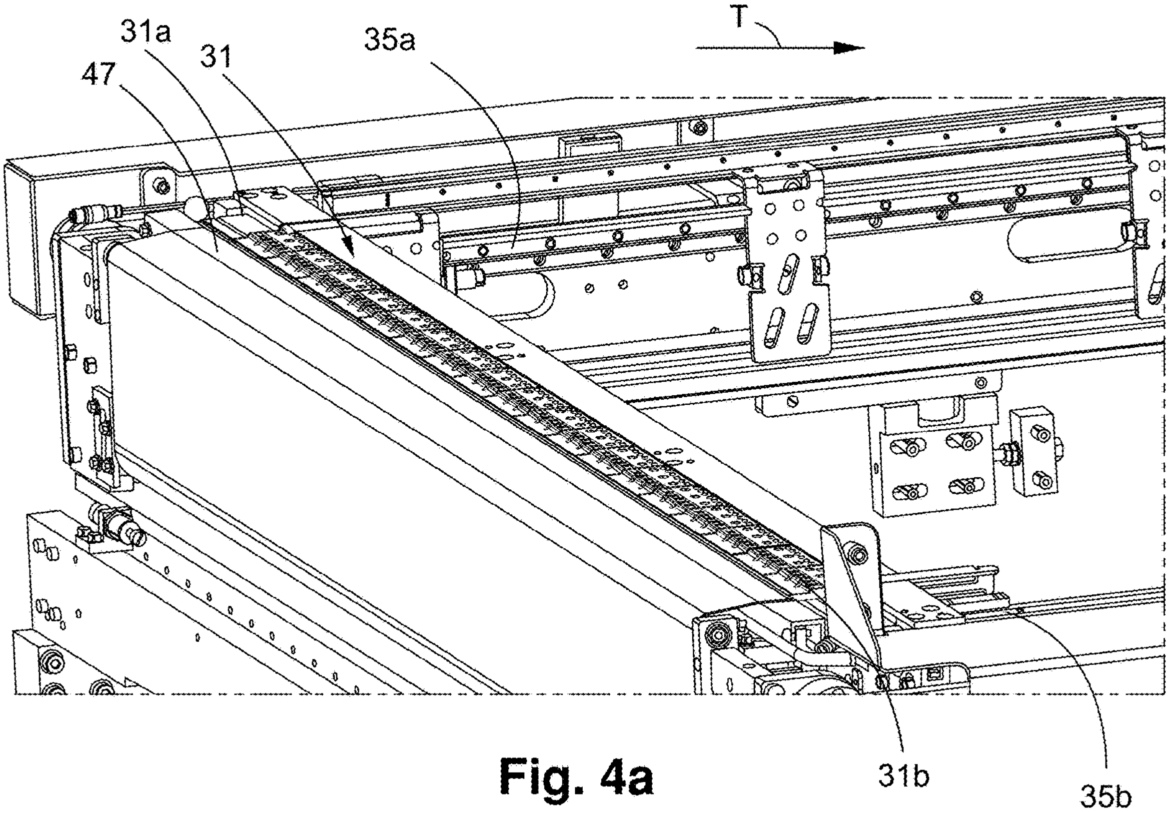
FIG. 4*a* is a schematic perspective view of a suction bar assembly mounted in a converting machine.
Figure 4B:
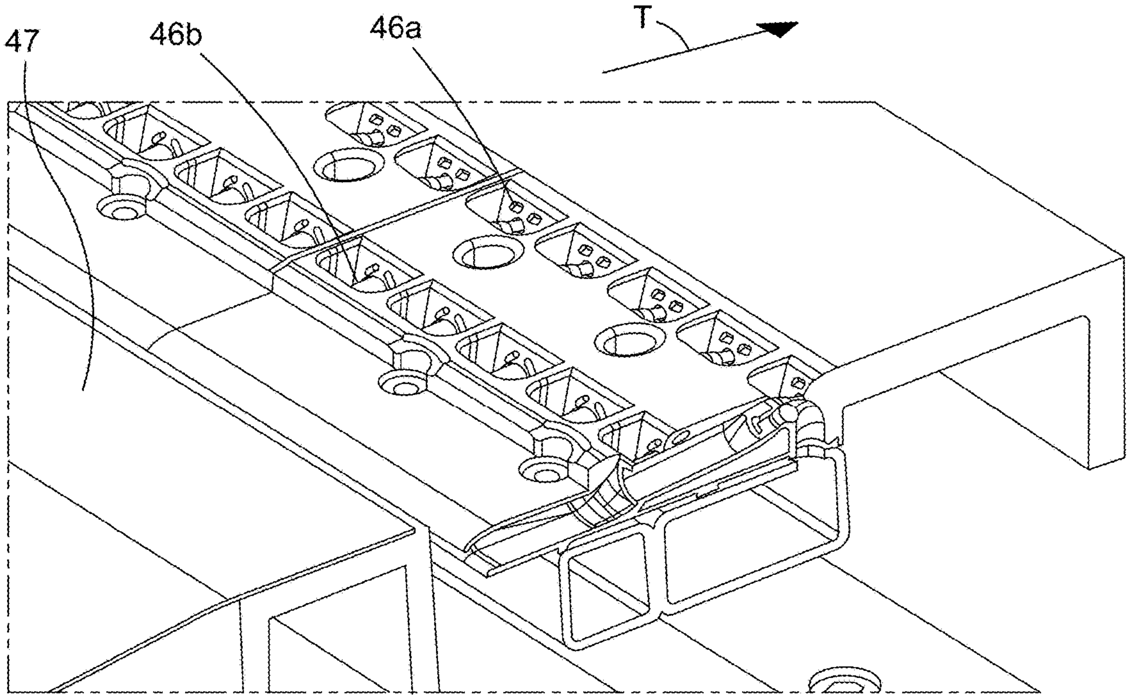
FIG. 4*b* is a detailed cross-sectional view of the suction plate connected to an airflow duct.

As best seen in FIG. 4*a*, the position of the suction bar assembly 31 is preferably adjustable in the direction of transportation T. In such a way, the position of the suction bar assembly 31 can be adapted to the longitudinal length L1 of the blank 12. A displacement mechanism 35 in the form of a first slide rail 35*a* and second slide rail 35*b* may be arranged at distal ends 31*a*, 31*b* of the suction bar assembly 31 and engage with cooperating connection parts on the suction bar assembly 31.

The blank 12 is thus held firmly and flat between a gripper unit 22 and a suction bar assembly 31. This ensures that the punching operation performed by the platen press unit 10*b* provides the cutting lines and crease lines at correct positions and such that the geometry of the cut-out blanks 12 is correct.

The combination of the gripper unit 22 and the suction bar assembly 31 forms a positioning system.

Figure 2:
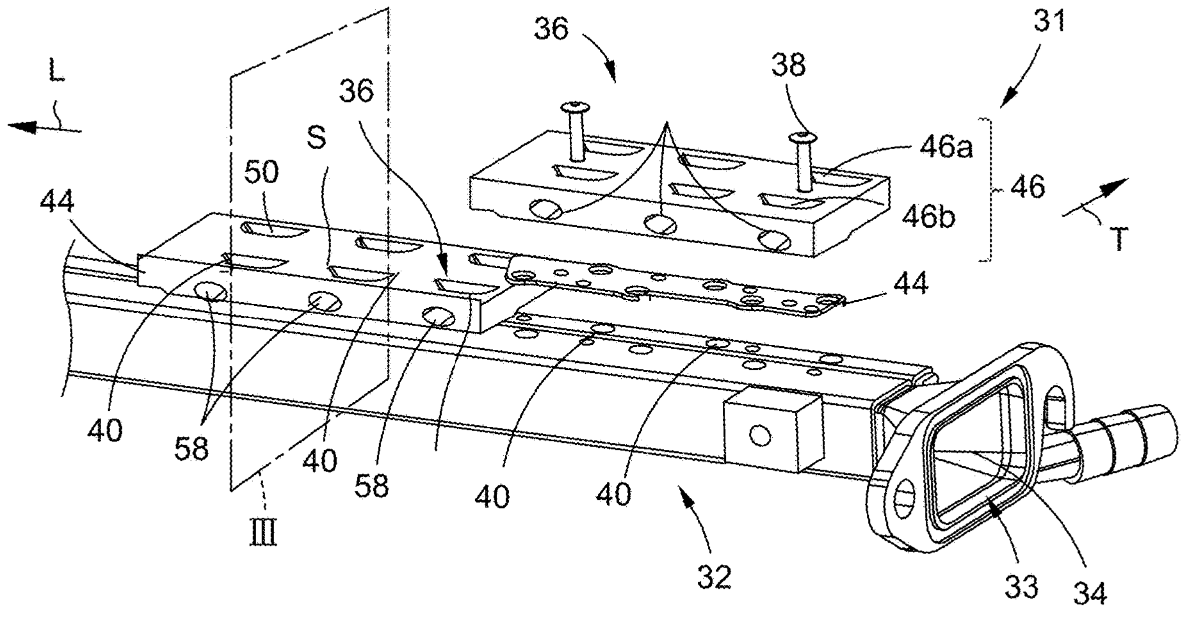
FIG. 2 is a schematic perspective view of a suction bar assembly according to an embodiment of the present invention.

As illustrated in FIG. 2, each suction bar assembly 31 comprises an elongated transverse beam 32 having an internal air supply conduit 34, and a suction plate 36 comprising a suction surface S.

The suction surface S of the suction plate 36 is configured to apply suction against the blank 12 such that the rear edge 12" adheres thereto. The suction surface S on the suction plate 36 comprises a plurality of suction openings 46 configured to apply suction against the blank 12.

Preferably, only a portion of the longitudinal length L1 of the blank 12 is contact with the suction surface S. A rear portion of the blank 12 such as approximately 75% of longitudinal length L1 of the blank 12 in the direction of transportation T may be in contact with the suction surface S during the deceleration of the blank 12. The front part such as 25% of the longitudinal length L1 of the blank 12 is thus not in contact with the suction surface S.

This allows the blank 12 to obstruct the first suction openings 46*a* on the suction surface S and grasp the rear portion of the blank 12. The blank 12 is thus decelerated and straightened as the suction surface S grasps the blank 12. The first suction openings 46*a* are located at a position of the rear edge of the blank and close to a position where the blank 12 is momentarily stopped. In an embodiment, the position of the first suction openings 46*a* is located at a distance between 0 mm and 50 mm from the rear edge of the blank 12 in the position where the blank 12 is momentarily stopped.

The blank 12 is positioned at a vertical distance in relation to the suction surface S of the suction plate 36. This vertical distance is measured between the suction surface S and the blank 12 in the attachment point to the gripper unit 22. The distance between the suction surface S and the blank 12 can be up to 16 mm. The suction force with which the blank 12 is attracted to the suction bar assembly 31 is selected to be sufficient to hold the blank 12 flat.

The suction plate 36 is attached to the elongated transverse beam 32. The connection between the suction plate 36 and the elongated transverse beam 32 may be provided by fasteners 38, such as screws, bolts or rivets 38. The suction plate 36 can be removably mounted to the elongated transverse beam 32.

The suction plate 36 may be produced in an additive manufacturing process, i.e., a 3D printing process. This allows the formation of complex internal airflow channels in the suction plate 36. Alternatively, the suction plate 36 may be produced by other conventional manufacturing methods involving shaping sheet metal or machining metal with tooling.

In the example shown in FIG. 2, a plurality of suction plates 36 are mounted on the top surface of the elongated transverse beam 32. However, it is also possible to provide a single suction plate 36 which extends over the length of the elongated transverse beam 32 in the longitudinal direction L.

The longitudinal direction L and the longitudinal extension of the suction bar assembly 31 are perpendicular to the direction of transportation T.

The air supply conduit 34 is provided with an air inlet 33 connected to an airflow generator (not illustrated). A plurality of air outlet openings 40 is arranged on a top surface of the elongated transverse beam 32. The air outlet openings 40 from the air supply conduit 34 are configured to be aligned with mating air inlet openings 42 (visible in FIG. 3) in the suction plate 36. Preferably, a seal 44 is arranged in-between the air supply conduit 34 and the suction plate 36. The seal 44 comprises apertures in the locations where the air outlet openings 40 are aligned with the air inlet openings 42.

The suction openings 46 comprise a first group of suction openings 46*a*, and a second group of suction openings 46*b*. The first and the second groups of suction openings 46*a*, 46*b* may be arranged in lines with a linear extension coinciding with the longitudinal extension of the suction bar assembly 31.

Alternatively, the first suction openings 46*a* can be staggered in the longitudinal extension of the suction bar assembly 31. In such a way, the suction surface S comprises a regular array of suction openings 46*a*, 46*b*. This can be achieved by providing a varying distance d1 (visible in FIG. 3) between the first suction openings 46*a* and the second suction openings 46*b*. The second suction openings 46*b* can also be arranged in a staggered pattern.

The first and the second group of suction openings 46*a*, 46*b* may be positioned in a position upstream in each workstation This allows the gripper unit 22 to position the front edge of the blank 12 at the outlet of each workstation while the suction openings 46*a*, 46*b* apply suction and grasp the rear edge of the blank 12. The first group of suction openings 46*a* are configured to apply a suction force against the blank 12 such that the blank 12 adheres against the suction surface S of the suction bar assembly 31. The first group of suction openings 46*a* is preferably arranged further downstream in the direction of transportation T than the second group of suction openings 46*b*. The suction force is selected such as to maintain the blank 12 flat and prevent the rear edge of the blank 12 from lifting.

The second group of suction openings 46*b* are configured to generate a high-volume debit of air such as to reduce by suction the amount of air located in-between the blank 12 and the suction bar assembly 31.

There is a lower pressure in the first group of suction openings 46*a* than in the second group of suction openings 46*b*. In an embodiment, the pressure in the first suction openings 46*a* may be between 0 mbar and −600 mbar, preferably between −40 mbar and −200 mbar. The pressure in the second suction openings 46*b* is between 0 mbar and −150 mbar, preferably between 0 mbar and −40 mbar.

Figure 3:
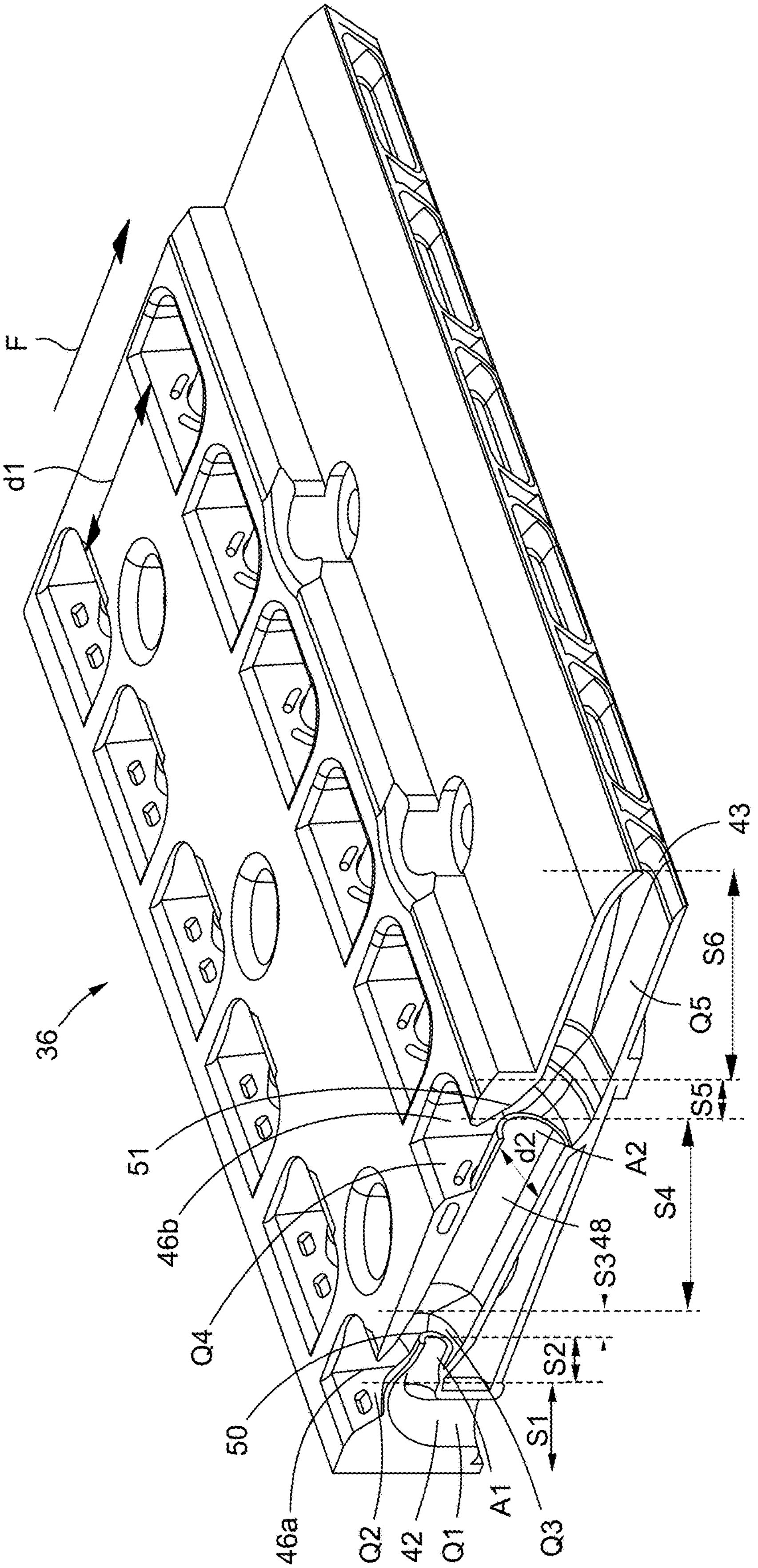
FIG. 3 is a schematic perspective view with a cut-away portion showing a suction plate for the suction bar assembly of FIG. 2.

This difference in pressure is achieved by a specific channel design in the suction plate 36. As best seen in FIG. 3, the suction plate 36 comprises a plurality of main airflow channels 48 extending from the inlet openings 42 to outlet openings 43. The inlet openings 42 are connected to the central air supply conduit 34 as previously described. The outlet openings 43 may be located under a flange 47 in the suction bar assembly 31. The flange 47 may be in the form of a plate element and configured to divert the exit airflow from the main airflow channels 48.

The air flow rate through the first suction and second suction openings 46*a*, 46*b* openings may be up to 3000 l/min.

Each main airflow channel 48 has a plurality of sections S1 to S6 with different geometries in the airflow direction F.

In a direction from the inlet opening 42 to the outlet opening 43, the main airflow channel 48 comprises an inlet section S1, a constricted section S2, a first connection section S3, a distance section S4, a second connection section S5, and an outlet section S6.

The inlet section S1 may be curved to vertically align the inlet opening 42 with the air supply opening 40 in the suction bar assembly 31. The inlet section S1 allows to direct the inlet air flow Q1 into the main airflow channel 48. In the inlet section S1, an inlet airflow Q1 is received. The pressure in the inlet section S1 is similar to the pressure in the air supply channel 34 and the velocity of the airflow v1 is selected with respect to the cross-sectional area of the inlet section S1.

The constricted section S2 is a venturi section configured to provide an acceleration of the airflow, such that the air velocity is increased. The constricted section S2 is funnel shaped such that the cross-sectional area of the main airflow channel 48 is gradually decreased in the airflow direction F. The airflow velocity v2 in the constricted section S2 is higher than the airflow velocity v1 in the inlet section S1, while the pressure is reduced in the constricted section S2 to be lower than in the inlet section S1. The flow rate Q2 through the constricted section S2 is equal to the flow rate Q1 in the inlet section S1.

The first connection section S3 comprises a connecting duct 50 extending from the main airflow channel 48 to the first suction opening 46*a*. The inlet of the first connection section S3 is located at the outlet of the constricted section S2. The first suction opening 46*a* is thus connected to the outlet of the constricted section S2. The reduced pressure at the outlet of the constricted section S2 generates a pressure drop in the first connection duct 50. This creates a high suction force through the first suction opening 46*a*.

Consequently, an additional airflow Q2 is sucked into the main airflow channel 48 through the first suction opening 46*a*. This provides an increased airflow in the connection section S3. The airflow Q3 through the first connection section S3 equals the sum of Q1 and Q2. The connection section S3 also has a larger cross-sectional area than the constricted section.

The distance section S4 is provided with an approximately constant cross-sectional area and ensures that the first suction opening 46*a* is spaced apart at a distance d1 from the second suction opening 46*b*. The distance d1 may be selected such as to be long enough to reduce turbulence in the airflow at the end of the distance section S4. The distance d1 is preferably less than 10 times a diameter d2 of the main airflow channel 48 at the second suction opening 46*b*.

The second connection section S5 to the second suction opening 46*b* is located at the outlet of the distance section S4. The cross-sectional area of the distance section S4 is larger than the inlet section S1, and the airflow Q5 through the second connection section S5 is higher than the inlet airflow Q1. This induces a high air debit volume Q4 through the second suction openings 46*b*. In an embodiment, there can be several second suction openings 46*b* connected to each main airflow channel 48.

The outlet section S6 is configured to divert the airflow through outlet openings 43. The airflow Q5 in the outlet section S6 is the sum of the inlet airflow Q1 and the airflows Q2 and Q4 provided through the first and second suction openings 46*a*, 46*b*.

The invention claimed is:

1. A suction bar system for a converting machine, the suction bar system comprising:

at least one suction bar assembly comprising a suction plate mounted on a transverse beam having an internal air supply channel, the suction plate having a suction surface configured to apply suction against a blank conveyed in a direction of transportation through the converting machine, wherein the suction plate comprises a plurality of main airflow channels, each main airflow channel comprising an air inlet connected to the air supply channel and an air outlet, and wherein a flow direction extends between the air inlet and the air outlet, wherein each of the main airflow channels is provided with a first suction opening and a second suction opening, said suction openings being provided on the suction surface, and wherein the main airflow channel is provided with a constricted section with a first connecting duct connected to the first suction opening and wherein the constricted section is configured to generate a pressure drop in the first suction opening, and wherein the main airflow channels have a cross-sectional area in the flow direction upstream of the second suction openings which is larger than the cross-sectional area of the constricted section.

2. The suction bar system according to claim 1, wherein said first and second suction openings are arranged in separate lines perpendicular to the direction of transportation.

3. The suction bar system according to claim 1, wherein the constricted section of the main airflow channel is a venturi section.

4. The suction bar system according to claim 1, wherein the second suction opening is connected to the main airflow channel via a second connecting duct.

5. The suction bar system according to claim 4, wherein the connection duct to the first suction opening is located upstream of the connection duct to the second suction opening in the flow direction.

6. The suction bar system according to claim 1, wherein the first suction openings are located further downstream in the direction of transportation than the second suction openings.

7. The suction bar system according to claim 1, wherein the internal air supply channel has an inlet end connected to an airflow generator and is provided with a plurality of distribution outlet openings configured to be aligned with air inlet openings on the suction plate.

8. The suction bar system according to claim 1, wherein the suction plate is a separate part and is removably mounted to the transverse beam.

9. The suction bar system according to claim 1, the first suction openings are arranged at a distance from the second suction openings, and wherein the distance is less than 10 times a diameter of the main airflow channel at the second suction opening.

10. The suction bar system according to claim 1, wherein a distance between the first suction opening and the second suction opening is different among the main channels.

11. The suction bar system according to claim 1, further comprising a deflection flange, and wherein the outlet opening of the main airflow channel is located under the deflection flange.

12. The suction bar system according to claim 1, further comprising a displacement mechanism comprising a first and second slide rails and wherein the suction bar is slidably mounted to the slide rail.

13. A positioning system comprising:

the suction bar system according to claim 1; and a gripper unit, the gripper unit being configured to grasp and position a front leading edge of the blank, wherein the suction bar system is positioned with the first suction opening located further downstream in the direction of transportation than the second suction openings.

14. The positioning system according to claim 13, wherein a plurality of suction bar assemblies is arranged along the direction of transportation.

15. A suction bar system for a converting machine, the suction bar system comprising:

at least one suction bar assembly comprising a suction plate mounted on a transverse beam having an internal air supply channel, the suction plate having a suction surface configured to apply suction against a blank conveyed in a direction of transportation through the converting machine, and a deflection flange, wherein the suction plate comprises a plurality of main airflow channels, each main airflow channel comprising an air inlet connected to the air supply channel and an air outlet, and wherein a flow direction extends between the air inlet and the air outlet, wherein each of the main airflow channels is provided with a first suction opening and a second suction opening, said suction openings being provided on the suction surface, and wherein the main airflow channel is provided with a constricted section with a first connecting duct connected to the first suction opening and wherein the constricted section is configured to generate a pressure drop in the first suction opening, and wherein the outlet opening of the main airflow channel is located under the deflection flange.

16. The suction bar system according to claim 15, wherein the first suction openings are located further downstream in the direction of transportation than the second suction openings.

17. The suction bar system according to claim 15, wherein said first and second suction openings are arranged in separate lines perpendicular to the direction of transportation.

18. The suction bar system according to claim 15, wherein the constricted section of the main airflow channel is a venturi section.

19. The suction bar system according to claim 15, wherein the second suction opening is connected to the main airflow channel via a second connecting duct.

20. The suction bar system according to claim 19, wherein the connection duct to the first suction opening is located upstream of the connection duct to the second suction opening in the flow direction.

* * * * *